US011943555B2

(12) United States Patent
Cai et al.

(10) Patent No.: US 11,943,555 B2
(45) Date of Patent: Mar. 26, 2024

(54) PIXEL PROCESSING CIRCUIT AND READING METHOD THEREOF, AND IMAGE SENSOR

(71) Applicant: Chengdu Image Design Technology Co., Ltd., Chengdu (CN)

(72) Inventors: Hua Cai, Chengdu (CN); Yong Wang, Chengdu (CN); Tian Xia, Chengdu (CN)

(73) Assignee: CHENGDU IMAGE DESIGN TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/976,903

(22) Filed: Oct. 31, 2022

(65) Prior Publication Data

US 2023/0412946 A1 Dec. 21, 2023

(30) Foreign Application Priority Data

May 31, 2022 (CN) .......................... 202210607372.5

(51) Int. Cl.
*H04N 25/77* (2023.01)
*H04N 23/10* (2023.01)
*H04N 25/772* (2023.01)

(52) U.S. Cl.
CPC ........... *H04N 25/772* (2023.01); *H04N 23/10* (2023.01)

(58) Field of Classification Search
CPC .............................. H04N 25/772; H04N 23/10
See application file for complete search history.

(56) References Cited

U.S. PATENT DOCUMENTS

2006/0227228 A1 10/2006 Nam
2021/0281794 A1* 9/2021 Yoda .................... H04N 25/772

FOREIGN PATENT DOCUMENTS

| CN | 108398243 A | 8/2018 |
| CN | 109040624 A | 12/2018 |
| CN | 109076179 A | 12/2018 |
| CN | 109816597 A | 5/2019 |

* cited by examiner

*Primary Examiner* — Twyler L Haskins
*Assistant Examiner* — Fayez A Bhuiyan
(74) *Attorney, Agent, or Firm* — Andrew C. Cheng

(57) ABSTRACT

A pixel processing circuit, a reading method thereof and an image sensor are provided. The pixel processing circuit includes a pixel array comprising a plurality of pixel units arranged in a Bayer array, an Analog-to-Digital Converter (ADC) module comprising a plurality of analog-to-digital converters and a plurality of switch selection modules. The analog-to-digital converters are respectively located on the opposite first side and second side of the pixel array. The switch selection modules are set between the pixel array and the analog-to-digital converters to switch the connectivity between the pixel units and the analog-to-digital converters on the opposite sides of the pixel array so that signals of green pixel units are read by first analog-to-digital converters located at the first side of the pixel array, and signals of remaining color pixel units are read by second analog-to-digital converters that are located at the second side of the pixel array.

8 Claims, 6 Drawing Sheets

|     | Gb1 |     |
| --- | --- | --- |
| Gr1 | R   | Gr2 |
|     | Gb2 |     |

FIG. 4

PIXEL PROCESSING CIRCUIT AND READING METHOD THEREOF, AND IMAGE SENSOR

CROSS-REFERENCE TO THE RELATED APPLICATIONS

This application is based upon and claims priority to Chinese Patent Application No. 202210607372.5, filed on May 31, 2022, the entire contents of which are incorporated herein by reference.

TECHNICAL FIELD

The present invention relates to the field of integrated circuit design, in particular to a pixel processing circuit applied in a CMOS image sensor, a reading method thereof and an image sensor.

BACKGROUND

CMOS Image Sensors (CIS) have been widely used in imaging fields such as video, surveillance, industrial manufacturing, automobiles, and home appliances. The mainstream readout circuit configuration of a CIS is based on a column-level analog-to-digital converter (ADC) to ensure that the CIS has enough conversion accuracy and speed under reasonable power consumption. When the pixel size is small, it is impossible to achieve that one ADC column corresponds to one pixel column by adopting the parallel column ADC readout structure with single-sided arrangement, so this design can only be achieved by adopting the parallel column ADC readout structure with bilateral arrangement on the pixel array. This bilateral arrangement of two ADC arrays cannot avoid a mismatch, which results in a fixed parity column difference. This difference causes deviations in values of Gr and Gb green channels in a Bayer Pattern, which results in a clear boundary line at the boundary of the interpolated pixel units, that is, the image shows a so-called "maze pattern". The difference between the two ADC arrays is caused by processing process and other factors, even if the process and layout design are optimized, the difference can only be reduced to a certain extent. However, when the gain is large, the above anomaly still exists. The prior art, such as the patent document with the publication number CN109040624A, discloses a pixel circuit and a reading method, but does not solve the technical problem proposed by the present invention.

Therefore, the present invention provides a pixel processing circuit, a reading method thereof and an image sensor, which can eliminate the difference between the Gr channel and the Gb channel, thereby avoiding the appearance of "maze pattern" in an image.

SUMMARY

The present invention provides a pixel processing circuit and a reading method thereof, an image sensor. By adding a switch selection module between a pixel array and an ADC module, and by controlling the state of the switch selection module, the pixel signals passing through the Gr channel and the Gb channel are read by the ADCs on a same side of the pixel array, ensuring that the pixel signals of the Gr channel and the Gb channel do not have value deviation, thereby avoiding the phenomenon of "maze pattern" after image interpolation and ensuring image quality.

In the first aspect, the present invention provides a pixel processing circuit configured for being applied to an image sensor of a bilateral parallel ADC readout architecture, the circuit comprising: a plurality of pixel units arranged in a Bayer array, an Analog-to-Digital Converter (ADC) module comprising a plurality of analog-to-digital converters, and a plurality of switch selection modules, the number of the switch selection modules set to be half of the number of the analog-to-digital converters;

the plurality of analog-to-digital converters comprising first analog-to-digital converters located on a first side of the pixel array and second analog-to-digital converters located on a second side of the pixel array opposite to the first side, each of the switch selection modules configured to have a first unit disposed between the first side of the pixel array and one of the first analog-to-digital converters, and a second unit disposed between the second side of the pixel array and one of the second analog-to-digital converters;

wherein the switch selection modules are configured to switch the communication between the pixel units and the first and second analog-to-digital converters on the opposite first and second sides of the pixel array, such that signals of green pixel units are read by the first analog-to-digital converters, and signals of remaining color pixel units are read by the second analog-to-digital converters.

The present invention has the advantages that by controlling the state of the switch selection modules, the present invention achieves the ADC conversion of the pixel signals passing through the Gr channel and the Gb channel through the same side of the pixel array, ensuring that the pixel signals of the Gr channel and the Gb channel do not have value deviation, thereby avoiding the phenomenon of "maze pattern" after image interpolation and ensuring image quality.

Optionally, each of the switch selection modules comprises a plurality of switching circuits at least including a first switching circuit, a second switching circuit, a third switching circuit and a fourth switching circuit; wherein a number of columns of the pixel array is even, the first switching circuit and the second switch circuit are located at the first side of the pixel array and the third switching circuit and the fourth switching circuit are located at the second side of the pixel array; the pixel units in each of odd-numbered columns of the pixel array are respectively electrically connected to one end of the first switching circuit, and are respectively electrically connected to one end of the third switching circuit of the switch selection module; the pixel units in each of even-numbered columns of the pixel array are respectively electrically connected to one end of the second switching circuit of the switch selection module, and are respectively electrically connected to one end of the fourth switching circuit of the switch selection module; wherein another ends of adjacent first switching circuit and second switching circuit are electrically connected to the common first analog-to-digital converter, another ends of adjacent third switching circuit and fourth switching circuit are electrically connected to the common second analog-to-digital converter, and each of the switching circuits is electrically connected to only one analog-to-digital converter.

Further, optionally, the first switching circuit includes at least one switch, the second switching circuit includes at least one switch, the third switching circuit includes at least one switch, and the fourth switching circuit includes at least one switch.

Optionally, each column of pixel units is connected to a corresponding switching circuit through an output bus.

Optionally, the pixel unit includes a photodiode, a transfer transistor, a reset transistor, a source-follower transistor, and a row selection transistor; one end of the photodiode is grounded, and the other end of the photodiode is connected to a drain of the transfer transistor; a gate of the transfer transistor is configured for accessing a TX signal, a source of the transfer transistor is connected to a drain of the reset transistor, and a gate of the source-follower transistor; a source of the reset transistor is configured for accessing a power supply signal, and a gate of the reset transistor is configured for accessing an RX signal; a source of the source-follower transistor is configured for accessing the power supply signal, a drain of the source-follower transistor is connected to a source of the row selection transistor, a gate of the row selection transistor is configured for accessing an SEL signal, and a drain of the row selection transistor is connected to the output bus of the pixel unit; wherein the drain of the reset transistor is connected to the source of the row selection transistor to obtain a row selection control signal for transferring the pixel signal through the row selection transistor.

Optionally, the analog-to-digital converter includes a comparator and a counter electrically connected to the comparator.

In a second aspect, the present invention provides a reading method of a pixel processing circuit, being applied to the pixel processing circuit in the second item of the first aspect, including:

performing row-by-row reading and quantization processing for pixel units in a pixel array according to a row selection control signal, including:

adjusting a conduction state of each switch selection module so that pixel signals of green pixel units and pixel signals of remaining color pixel units in each row of the pixel array are respectively read by the analog-to-digital converters located at different sides of the pixel array while pixel signals of the green pixel units in different rows of the pixel array are read by the analog-to-digital converters located at a same side of the pixel array;

the remaining color pixel units being red pixel units and/or blue pixel units.

Optionally, the conduction state of the switch selection module includes: at a time of a read phase, a first switching circuit and a fourth switching circuit of the switch selection module being in a same conduction state, a second switching circuit and a third switching circuit being in the same conduction state, the first switching circuit and the third switching circuit being in opposite conduction states, and the conduction state of the switch selection module being opposite when reading odd-numbered rows and even-numbered rows of the pixel array.

In a third aspect, the present invention provides an image sensor including: the pixel processing circuit as described in any one of the first aspect; a control logic module for controlling the pixel processing circuit to process a pixel signal; and a data processing module for obtaining a signal processed by the pixel processing circuit.

Reference can be made to the description in the above first aspect for the beneficial effects in the above second or third aspects.

BRIEF DESCRIPTION OF THE DRAWINGS

FIG. 4 is a schematic diagram of a pixel array based on a Bayer pattern;

DETAILED DESCRIPTION OF THE EMBODIMENTS

The technical solution in the embodiment of the present application will be described with reference to the drawings in the embodiment of the present application. In the description of embodiments of the present application, the terms used in the following embodiments are for the purpose of describing specific embodiments only and are not intended to be limiting to the present application. As used in the description of the present application and the appended claims, the singular expressions "a", "the", "above", "said" and "this" are intended to also include such expressions as "one or more", unless the context expressly dictates to the contrary. It should also be understood that in the following embodiments of the present application, "at least one" and "one or more" refer to one or more than two (inclusive). The term "and/or" is used to describe the association relationship of associated objects, indicating that there can be three relationships. For example, A and/or B can represent the case where A exists alone, A and B exist at the same time, and B exists alone, where A and B can be singular or plural. The character "/" generally indicates that the related objects are an alternative relationship.

References to "one embodiment" or "some embodiments" or the like described in the description are intended to include in one or more embodiments of the present application particular features, structures, or features described in conjunction with the embodiment. Thus, statements "in one embodiment," "in some embodiments," "in other embodiments," "in yet other embodiments," and the like appearing in differences in the description do not necessarily all refer to the same embodiment, but mean "one or more but not all embodiments," unless otherwise specifically emphasized. The terms "including", "comprising", "having" and variations thereof all mean "including but not limited to", unless otherwise specifically emphasized. The term "connection" includes direct connection and indirect connection, unless otherwise stated. The terms "first", "second" are for descriptive purposes only and cannot be construed as indicating or implying relative importance or implying the number of the indicated technical features.

In embodiments of the present application, the words "exemplary" or "for example" are used as examples, illustrations, or description. Any embodiment or design described as "exemplary" or "for example" in embodiments of the present application should not be construed as being more preferred or advantageous than other embodiments or designs. Rather, the use of the words "exemplary" or "for example" is intended to present related concepts in a concrete manner.

Figure 1:
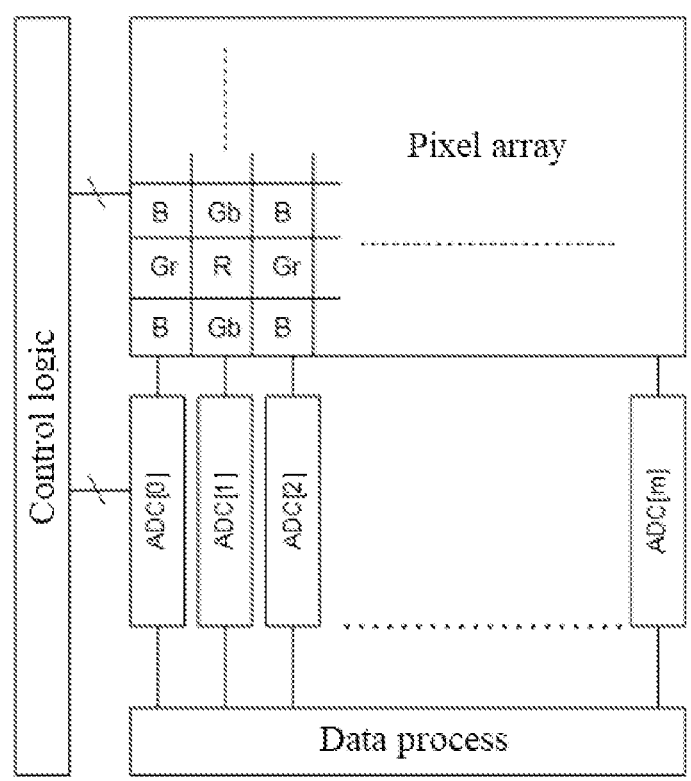
FIG. 1 is an overall circuit configuration diagram of a CMOS image sensor.

In the prior art, the overall circuit configuration of the CMOS image sensor is shown in FIG. 1. The circuit configuration consists of a pixel array, a column ADC module, a column memory unit (not shown in FIG. 1), a data processing section and a control logic section. The pixel array is composed of several pixel units, and the pixel units convert photocharges into analog voltage quantity after photosensing. The pixel signals of the pixel units in each column of the pixel array are converted from analog to digital by the corresponding ADC in the column ADC module, and then the subsequent data processing is carried out. There are M+1 columns of pixel array in FIG. 1, corresponding to M+1 ADCs, which can be ADC (0), ADC (1), . . . , ADC (M), that is, each column in the pixel array corresponds to one ADC.

Figure 2:
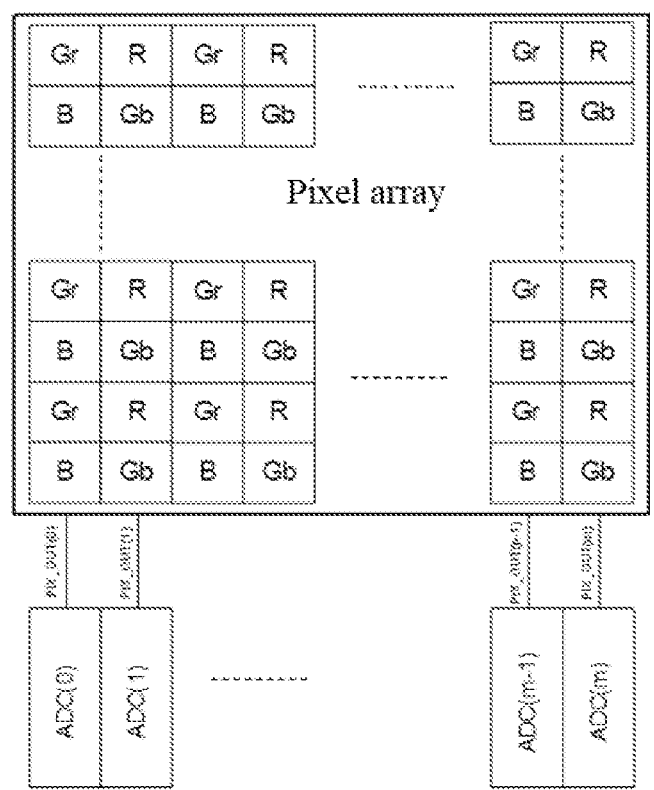
FIG. 2 is a schematic diagram of a CIS readout circuit architecture.
Figure 3:
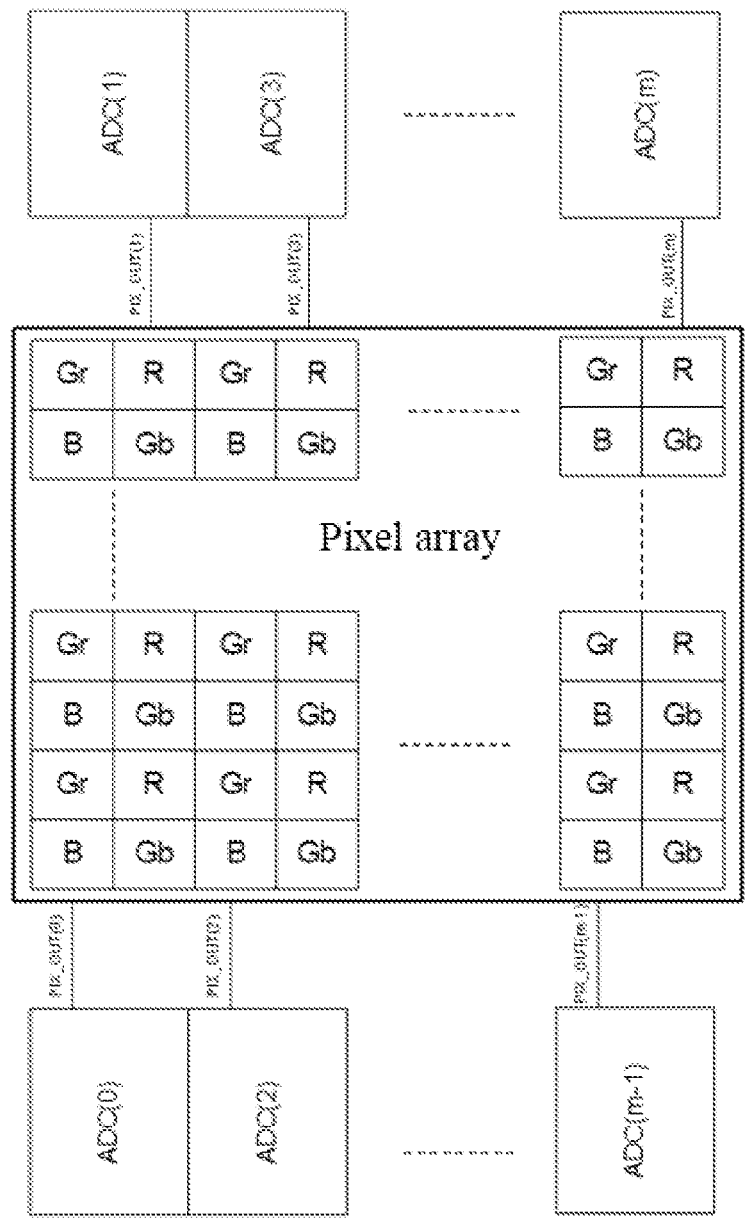
FIG. 3 is a schematic diagram of another CIS readout circuit architecture.

At present, the commonly used CIS readout circuit architecture adopts unilateral parallel ADC readout architecture, as shown in FIG. 2. That is, each ADC corresponds to the output of a column of pixels, and a pitch size (PZ) of each ADC in the column ADC module is exactly the same as a pitch size of each column of pixel units in the pixel array. When a size of the pixel unit is small, for example, PZ<2 μm, it is difficult to dispose the ADC in such a small width due to the process limitation. Therefore, in this case, the ADCs in the column ADC module are arranged on both sides of the pixel array, as shown in FIG. 3. However, since the ADCs are arranged on both sides of the pixel array, the deviation in process conditioning and power supply on both sides of the pixel array will lead to a slight difference between the ADCs on both sides, which is fixed for the same CIS chip. If the light is uniformly distributed, there will be a difference between the ADCs on both sides of the pixel array. That is, as shown in FIG. 3, there is a fixed deviation between the pixel signal output through the Gr channel in the even-numbered column and the pixel signal output through the Gb channel in the odd-numbered column. The Gr channel refers to a channel formed by a green pixel unit Gr and a transmission bus connected to the pixel. The Gb channel refers to a channel formed by a green pixel Gb and a transmission bus connected to the pixel.

Figure 4:
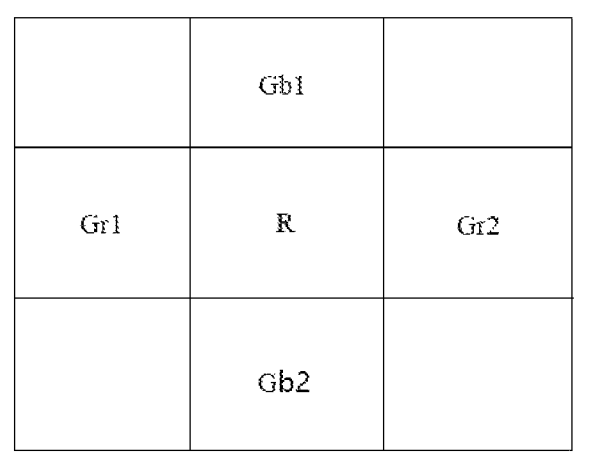

The general filter implementation of the CIS is based on a Bayer pattern, that is, RGB pattern including R (red), B (blue), Gr (green) and Gb (green) components. After normal illumination coming in, different colors of light will pass through the color filter, which makes R light, G light and B light reach the CIS, respectively. Then the CIS completes the conversion from illumination intensity to digital quantity, and then synthesizes the final image through the corresponding interpolation algorithm. FIG. 4 shows a simple Bayer pattern-based pixel array including a red pixel unit Gr, a green pixel unit Gb, a red pixel unit R and a blue pixel unit B (not labeled as shown in FIG. 4). As shown in FIG. 4, assuming that the red pixel unit R is a pixel point to be interpolated, if the green light component is interpolated to this point, it is necessary to collect the values of four nearby green light components (Gr1, Gr2, Gb1, Gb2) to synthesize the green component of the pixel point.

Ideally, the quantity after averaging the surrounding four green components is the interpolation quantity, and the gradient between the pixel point and the surrounding four pixels is 0, that is, R=Gr1=Gr2=Gb1=Gb2. But if there is a difference ΔK between the Gr channel and the Gb channel, Gr1=Gr2=Gb1+ΔK=Gb2+ΔK. In a case of the common bilinear interpolation, R=[(Gr1+Gr1)/2+(Gb1+Gb2)/2]/2=Gb1+ΔK/4, in which case, the gradient of the red pixel unit R from the green pixel unit Gr is |Gr1−R|+|Gr2−R|=3/2*ΔK. The gradient of the red pixel unit R from the green pixel unit Gb is |Gb1−PC|+|Gb2−PC|=½ *ΔK. Due to the existence of different gradients, it is inevitable that steps or pseudo-edges appears in flat areas. The interpolation synthesis algorithm of the actual CIS is not only so simple, this edge will be irregular, and the so-called "maze pattern" will be formed on the image.

Figure 5:
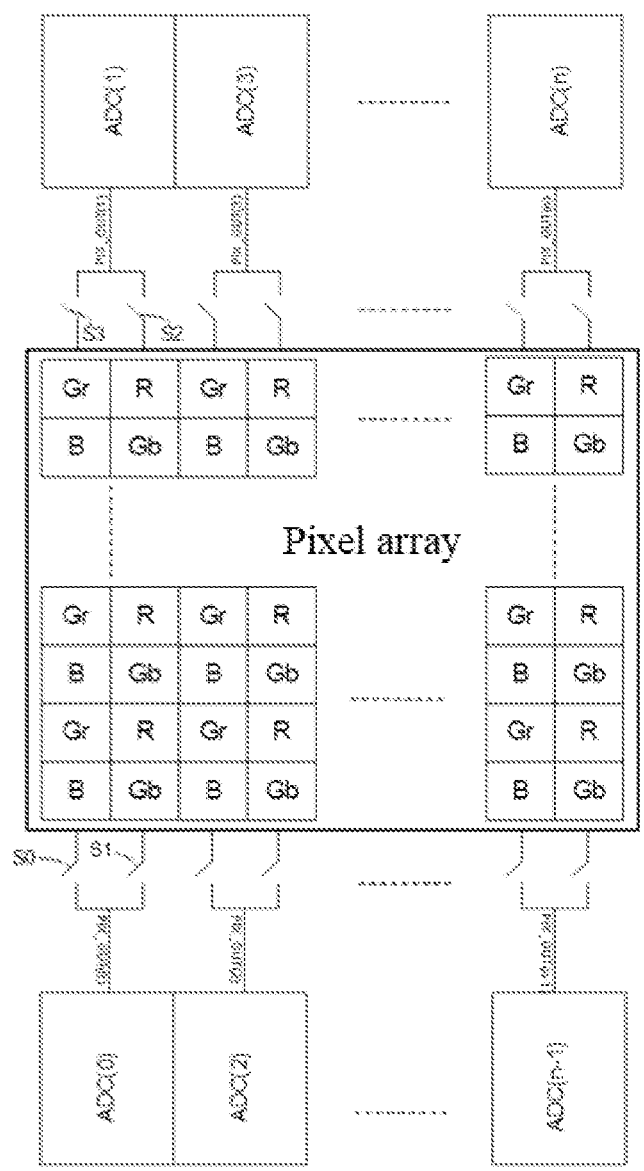
FIG. 5 is a schematic structural diagram of a pixel processing circuit according to an embodiment of the present invention.

In order to eliminate the maze pattern caused by the deviation, the present invention provides a pixel processing circuit, which is applied to an image sensor of a bilateral parallel ADC readout architecture, the circuit comprises a plurality of pixel units arranged in a Bayer array, an Analog-to-Digital Converter (ADC) module comprising a plurality of analog-to-digital converters, and a plurality of switch selection modules. In a preferred embodiment as shown in FIG. 5, the number of the switch selection modules is set to be half of the number of the analog-to-digital converters. In other embodiments, the number of the switch selection modules can be irrelated to that of the switch selection modules. In the embodiment as shown in FIG. 5, the plurality of analog-to-digital converters comprises first analog-to-digital converters located on a first side of the pixel array and second analog-to-digital converters located on a second side of the pixel array opposite to the first side. Each of the switch selection modules is configured to have a first unit disposed between the first side of the pixel array and one of the first analog-to-digital converters, and a second unit disposed between the second side of the pixel array and one of the second analog-to-digital converters. The switch selection modules are configured to switch the communication between the pixel units and the first and second analog-to-digital converters on the opposite first and second sides of the pixel array, such that signals of green pixel units are read by the first analog-to-digital converters located at the first side of the pixel array, such as ADC (0), ADC (2), ADC (4), . . . ADC (n−1), and signals of remaining color pixel units are read by the second analog-to-digital converters located at the second side of the pixel array such as ADC (1), ADC (3), ADC (5), . . . ADC (n).

By controlling the state of the switch selection modules, the present invention achieves the ADC conversion of the pixel signals passing through the Gr channel and the Gb channel through the same side of the pixel array, ensuring that the pixel signals of the Gr channel and the Gb channel do not have value deviation, thereby avoiding the phenomenon of "maze pattern" after image interpolation and ensuring image quality.

Optionally, the switch selection module comprising a plurality of switching circuits at least including a first switching circuit, a second switching circuit, a third switching circuit and a fourth switching circuit; wherein a number of columns of the pixel array is even, the first switching circuit and the second switch circuit are located at the first side of the pixel array and the third switching circuit and the fourth switching circuit are located at the second side of the pixel array; the pixel units in each of the odd-numbered columns of the pixel array are respectively electrically connected to one end of the first switching circuit of the switch selection module, and are respectively electrically connected to one end of the third switching circuit of the switch selection module; the pixel units in each of the even-numbered columns of the pixel array are respectively electrically connected to one end of the second switching circuit of the switch selection module, and are respectively electrically connected to one end of the fourth switching circuit of the switch selection module; wherein another ends of adjacent first switching circuit and second switching circuit are electrically connected to a common first analog-to-digital converter such as ADC (0), another ends of adjacent third switching circuit and fourth switching circuit are electrically connected to a common second analog-to-digital converter such as ADC (1), and each of the switching circuits is electrically connected to only one analog-to-digital converter.

Further, optionally, the first switching circuit includes at least one switch, the second switching circuit includes at least one switch, the third switching circuit includes at least one switch, and the fourth switching circuit includes at least one switch.

Optionally, in an embodiment of the present invention, each column of pixel units is connected to a corresponding switching circuit through an output bus. The output bus branches can be connected to a common bus via the switching circuits S0, S1, S2 and S3 as shown in FIG. 5. That is to say, each column of pixel units is connected to an output bus branch, which is electrically connected to an end of each of the switching circuits S0, S1, S2 and S3. And the output bus branches can be connected to a common bus such as PIX_OUT (0), PIX_OUT (2), . . . , PIX_OUT(n−1), and PIX_OUT (1), PIX_OUT (3), . . . , PIX_OUT (n).

Optionally, the pixel unit includes a photodiode, a transfer transistor, a reset transistor, a source-follower transistor, and a row selection transistor; one end of the photodiode is grounded, and the other end of the photodiode is connected to a drain of the transfer transistor; a gate of the transfer transistor is configured for accessing a TX signal, a source of the transfer transistor is connected to a drain of the reset transistor, and a gate of the source-follower transistor; a source of the reset transistor is configured for accessing a power supply signal, and a gate of the reset transistor is configured for accessing an RX signal; a source of the source-follower transistor is configured for accessing the power supply signal, a drain of the source-follower transistor is connected to a source of the row selection transistor, a gate of the row selection transistor is configured for accessing an SEL signal, and a drain of the row selection transistor is connected to the output bus of the pixel unit; wherein the drain of the reset transistor is connected to the source of the row selection transistor to obtain a row selection control signal for transferring the pixel signal through the row selection transistor.

Optionally, the analog-to-digital converter includes a comparator and a counter electrically connected to the comparator.

As shown in FIG. 5, a pixel processing circuit applied to an image sensor of a bilateral parallel ADC readout architecture includes a pixel array composed of pixel units, an ADC module composed of n+1 analog-to-digital converters, and a plurality of switch selection modules, where n is an odd number greater than or equal to 1. Each of the switch selection modules includes a first switching circuit S0, a second switching circuit S1, a third switching circuit S3 and a fourth switching circuit S2. The ADC module includes first analog-to-digital converters disposed on a first side of the pixel array and second analog-to-digital converters disposed on an opposite second side of the pixel array; wherein the number of columns of the pixel array is n+1; the pixel units in each of the odd-numbered columns of the pixel array are respectively electrically connected to one end of the first switching circuit S0 and electrically connected to one end of the third switching circuit S3. That is to say, the pixel units in each of the odd-numbered columns are electrically connected to only one first switching circuit S0 and only one third switching circuit S3. And the pixel units in each of the even-numbered columns of the pixel array are respectively electrically connected to one end of the second switching circuit S1, and are respectively electrically connected to one end of the fourth switching circuit S2. That is, the pixel units in each of the even-numbered columns are electrically connected to only one second switching circuit S1 and only one fourth switching circuit S2. And another ends of adjacent first switching circuit S0 and second switching circuit S1 are electrically connected to a common first analog-to-digital converter such as ADC (0), another ends of adjacent third switching circuit S3 and fourth switching circuit S2 are electrically connected to a common second analog-to-digital converter such as ADC (1), and each of the first switching circuit S0, the second switching circuit S1, the third switching circuit S3 and the fourth switching circuit S2 is electrically connected to only one analog-to-digital converter. The ADC module includes: ADC (0), ADC (1), ADC (2), ADC (3), . . . ADC (n−1), ADC (n), and the first analog-to-digital converters of ADC (0), ADC (2), . . . , ADC (n−1), and the second analog-to-digital converters of ADC (1), ADC (3), . . . ADC (n) are respectively arranged on both sides of the pixel array.

Based on the pixel processing circuit provided by the embodiment, the present invention also provides a reading method of the pixel processing circuit, which includes: performing row-by-row reading and quantization processing for pixel units in a pixel array according to a row selection control signal, including:

adjusting a conduction state of each switch selection module so that pixel signals of green pixel units and pixel signals of remaining color pixel units in each row of the pixel array are respectively read by the analog-to-digital converters located at different sides of the pixel array while pixel signals of the green pixel units in different rows of the pixel array are read by the analog-to-digital converters located at a same side of the pixel array;

the remaining color pixel units being red pixel units and/or blue pixel units.

In one possible embodiment, the conduction state of the switch selection module includes: at a time of a read phase, a first switching circuit and a fourth switching circuit of the switch selection module being in a same conduction state, a second switching circuit and a third switching circuit being in the same conduction state, the first switching circuit and the third switching circuit being in opposite conduction states, and the conduction state of the switch selection module being opposite when reading odd-numbered rows and even-numbered rows of the pixel array.

The readout process of pixel signals related to different colors in the pixel array is explained by the operation principle of the first switching circuit S0, the second switching circuit S1, the third switching circuit S3 and the fourth switching circuit S2. The pixel array in FIG. 5 includes green pixel units Gr, green pixel units Gb, red pixel units R, and blue pixel units B arranged in Bayer pattern. When a state of a control signal of the first switching circuit S0 is "high", the first switching circuit S0 is turned on. When the state of the control signal of the first switching circuit S0 is "low", the first switching circuit S0 is turned off. The second switching circuit S1, the fourth switching circuit S2, and the third switching circuit S3 are turned on and off in the same way.

As shown in FIG. 5, the first row of pixel units of the pixel array includes green pixel units Gb and blue pixel units B. When the TX signal is "low", the transfer transistor is turned off, firstly, the first switching circuit S0 and the fourth switching circuit S2 are controlled to be turned off, the second switching circuit S1 and the third switching circuit S3 are turned on, a reset signal of the blue pixel unit B is read out as B_VRST by ADC (1), and a reset signal Gb_VRST of the green pixel unit Gb is read out by ADC (0). After that, the state of the first switching circuit S0, the second switching circuit S1, the fourth switching circuit S2 and the third switching circuit S3 is controlled to remain unchanged and the TX signal becomes "high", the transfer transistor is turned on, and an integration signal Gb_VSIG of the green pixel unit Gb is read out by the ADC (0), and an integration signal B_VSIG of the blue pixel unit B is read out by the ADC (1). It can be seen that the pixel signal passing through the Gb channel electrically connected to the second switching circuit S1 is read out by the ADC (0). Then, in the same way, the pixel signals of the first row of pixel units are continued to be read, the pixel signals of the green pixel units Gb are respectively read by the first analog-to-digital converters of ADC (0), ADC (2), ADC (4), . . . ADC (n−1), while the pixel signals of the blue pixel units B are respectively read by the second analog-to-digital converters of ADC(1), ADC (3), ADC (5), . . . ADC (n). When the pixel signals of the green pixel units of a current row are read out, the switch selection module need to be controlled and adjusted so that the conduction states of the first switching circuit S0, the second switching circuit S1, the fourth switching circuit S2 and the third switching circuit S3 is reversed, so that the pixel signals of the green pixel units of a next row are also read out by the first analog-to-digital converters. Specifically, when reading the second row of pixel units, the first switching circuit S0 and the fourth switching circuit S2 are controlled to be turned on, the second switching circuit S1 and the third switching circuit S3 are turned off, the reset signal of the red pixel unit R is read out as R_VRST by ADC (1), and the reset signal Gr_VRST of the green pixel unit Gr is read out by ADC (0). After that, the state of the first switching circuit S0, the second switching circuit S1, the fourth switching circuit S2 and the third switching circuit S3 is controlled to remain unchanged and the TX signal becomes "high", the transfer transistor is turned on, and an integration signal Gr_VSIG of the green pixel unit Gr is read out by the ADC (0), and an integration signal R_VSIG of the red pixel unit R is read out by the ADC (1). Then, in the same way, the pixel signals of the second row of pixel units are continued to be read, and the signals of the green pixel units Gr are respectively read by the first analog-to-digital converters of ADC (0), ADC (2), ADC (4), . . . ADC (n−1), while the signals of the red pixel units R are respectively read by the second analog-to-digital converters of ADC (1), ADC (3), ADC (5), . . . ADC (n). The above timing control method can ensure that the pixel signals of Gr channel and Gb channel are read out by ADCs on the same side of pixel array, and the difference between Gr channel and Gb channel due to reading out by different ADC arrays as in the traditional bilateral parallel ADC architecture in FIG. 3 will not occur. Thus in this embodiment, the red pixel units and the blue pixel units can be read out by the second analog-to-digital converters such as ADC (1), ADC (3), ADC (5), . . . ADC (n). It should be noted that signals of the remaining color pixel units connected to a same switch selection module can be read out by a common analog-to-digital converter such as ADC (1), ADC (3), ADC (5), . . . ADC (n).

In other embodiments, the pixel processing circuit comprises a switch selection module and a plurality of analog-to-digital converters. The plurality of analog-to-digital converters comprise at least one first analog-to-digital converter such as ADC (0) located on a first side of the pixel array and at least one second analog-to-digital converter such as ADC (1) located on a second side of the pixel array opposite to the first side, the switch selection module is configured to have a first unit disposed between the first side of the pixel array and the at least one first analog-to-digital converters such as ADC (0), and a second unit disposed between the second side of the pixel array and the at least one second analog-to-digital converters such as ADC (1), wherein the switch selection module is configured to switch the communication between the pixel units and the first and second analog-to-digital converters on the opposite first and second sides of the pixel array, such that a signal or signals of green pixel units is read by the first analog-to-digital converter such as ADC (0) that is located at the first side of the pixel array, and a signal or signals of remaining color pixel units is read by the second analog-to-digital converter such as ADC (1) that is located at the second side of the pixel array. That is to say, a signal or signals of green pixel units can be read out by the common first analog-to-digital converter such as ADC (0) that is located at the first side of the pixel array, while a signal or signals of remaining color pixel units such as the red pixel units and/or the blue pixel units can be read out by the common second analog-to-digital converter such as ADC (1) that is located at the second side of the pixel array.

The basic structure and operation timing of pixel units are supplemented below.

Figure 6:
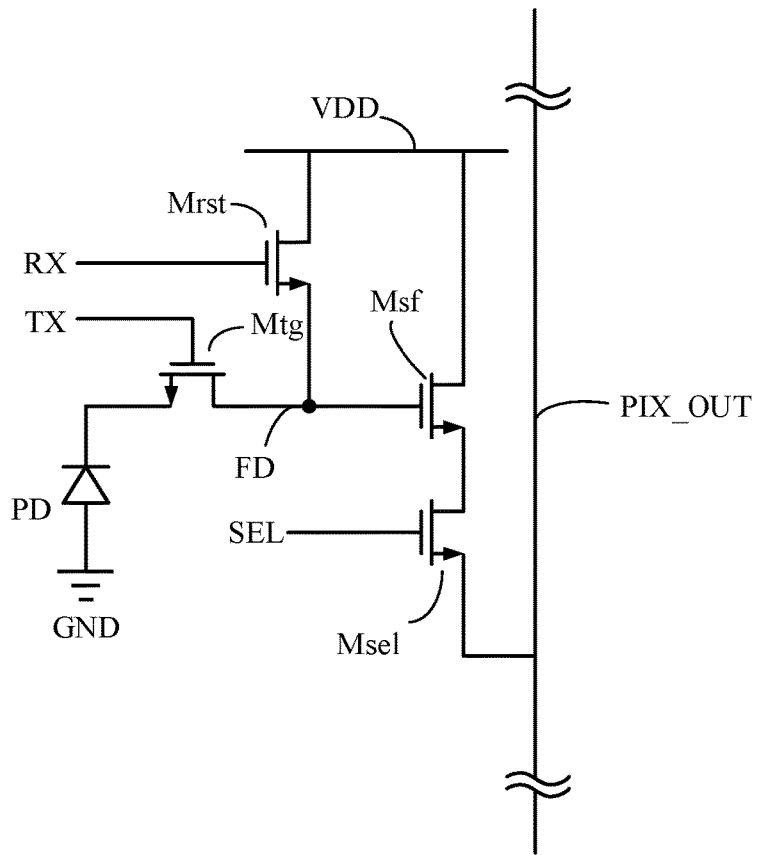
FIG. 6 is a circuit configuration diagram of a CIS standard four-transistor pixel unit.

FIG. 6 is a circuit configuration of a CIS standard four-transistor pixel unit, which is composed of a photodiode PD, a transfer transistor Mtg, a reset transistor Mrst, a source-follower transistor Msf, and a row selection transistor Msel. One end of the photodiode PD is grounded, and the other end of the photodiode PD is connected to the drain of the transfer transistor Mtg. A gate of the transfer transistor Mtg is configured for accessing a TX signal, a source of the transfer transistor Mtg is connected to a drain of the reset transistor Mrst, and a gate of the source-follower transistor Msf. A source of the reset transistor Mrst is configured for accessing a power supply signal, and a gate of the reset transistor Mrst is configured for accessing an RX signal. A source of the source-follower transistor Msf is configured for accessing the power supply signal, a drain of the source-follower transistor Msf is connected to a source of the row selection transistor Msel, a source of the row selection transistor Msel is configured for accessing an SEL signal, and a drain of the row selection transistor Msel is connected to the output of the pixel array. The PD generates photoelectrons proportional to the intensity of light when it is sensitized. The function of Mtg is to transfer photoelectrons in the PD. When the TX signal is at high potential, the Mtg is turned on to transfer photoelectrons in the PD to a floating node FD. The Mrst plays a role in resetting the FD when the RX signal is at high potential. The Msf is an amplifier tube. When the SEL signal is at high potential, the Msel is turned on, and the Msf and the Msel form a path between the current source and ground, at which time, the output of the Msf follows the change of potential of the FD.

Figure 7:
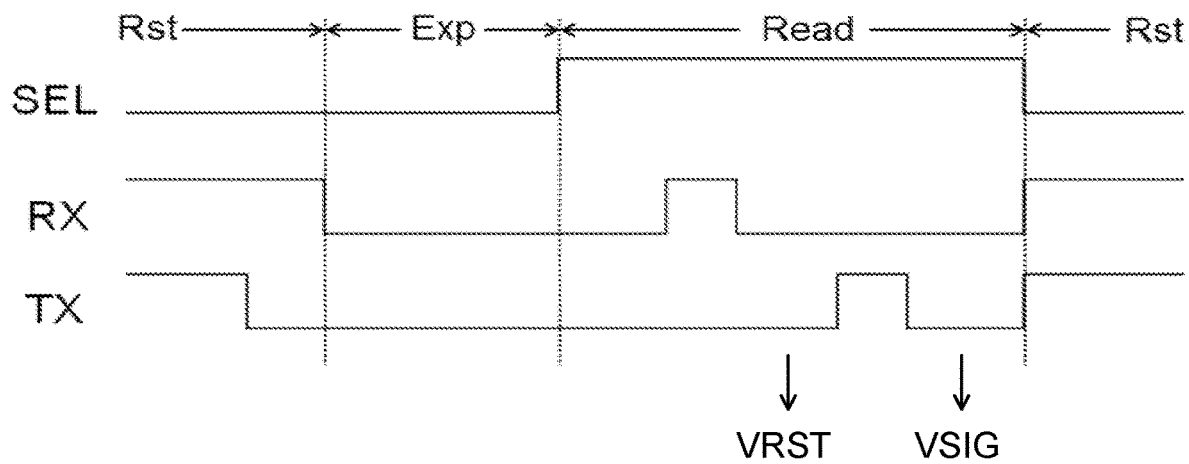
FIG. 7 is an operation timing diagram of an CIS standard four-transistor pixel unit.

FIG. 7 shows the operation timing of CIS standard four-transistor pixel unit, including phases of resetting (Rst), exposing (Exp) and signal reading (Read). In the Rst phase, the TX signal and RX signal are at "high" potential, both the Mtg and the Mrst are turned on, the FD is reset and its potential is pulled up to the power supply voltage VDD. Then the RX signal and the TX signal change to "low" potential, and enter the Exp phase, where PD senses light and accumulates electrons. Then, in the Read phase, the SEL signal is at "high" potential, the RX signal is at "high" potential first and is then pulled to "low" potential after the FD is reset, and the TX signal is kept at "low" potential. At this time, the Msf is controlled by the potential of the FD and outputs reset potential VRST through the PIX_OUT. After that, the TX signal is pulled to the "high" potential, and electrons on the PD are transferred to the FD. At this time, the Msf is controlled by the potential of the FD and outputs integrated potential VSIG through the PIX_OUT. The difference between VRST and VSIG is the analog voltage corresponding to photoelectrons on the PD. VRST and VSIG potentials are converted into digital quantities by the analog-to-digital converter (ADC) circuit and subtracted to obtain the actual digital quantities corresponding to the photoelectrons on the PD. If the ADC is 12 bits and the ADC reference voltage range is VREF, the final output is DOUT= (VRST−VSIG)×$2^{12}$/VREF.

Based on the pixel processing circuit provided by any of the above embodiments, the embodiment of the present application provides an image sensor, including: the pixel processing circuit described in any one of the above embodiments; a control logic module for controlling the pixel processing circuit to process a pixel signal; and a data processing module for obtaining a signal processed by the pixel processing circuit.

The above is only the detailed description of the embodiments of the present application, but the scope of protection of the embodiments of the present application is not limited thereto, and any change or replacement within the technical scope disclosed in the embodiments of the present application should be covered within the scope of protection of the embodiments of the present application. Therefore, the scope of protection of the embodiments of this application shall be subject to the scope of protection of the claims.

What is claimed is:

1. A pixel processing circuit configured for being applied to an image sensor of a bilateral parallel ADC readout architecture, the pixel processing circuit comprising:
   a pixel array comprising a plurality of pixel units arranged in a Bayer array,
   an Analog-to-Digital Converter (ADC) module comprising a plurality of analog-to-digital converters, and
   a plurality of switch selection modules;
   wherein a number of the switch selection modules is set to be half of a number of the analog-to-digital converters;
   the plurality of analog-to-digital converters comprise first analog-to-digital converters located on a first side of the pixel array and second analog-to-digital converters located on a second side of the pixel array opposite to the first side;
   each of the switch selection modules is configured to have a first unit disposed between the first side of the pixel array and one of the first analog-to-digital converters, and a second unit disposed between the second side of the pixel array and one of second analog-to-digital converters;
   wherein the switch selection modules are configured to switch a communication between the pixel units and the first and second analog-to-digital converters on the opposite first and second sides of the pixel array, such that signals of green pixel units are read by the first analog-to-digital converters, and signals of remaining color pixel units are read by the second analog-to-digital converters,
   wherein each of the switch selection modules comprises a plurality of switching circuits at least comprising a first switching circuit, a second switching circuit, a third switching circuit and a fourth switching circuit wherein a number of columns of the pixel array is even, the first switching circuit and the second switch circuit are located at the first side of the pixel array and the third switching circuit and the fourth switching circuit are located at the second side of the pixel array;
   the pixel units in each of odd-numbered columns of the pixel array are respectively electrically connected to a first end of the first switching circuit of the switch selection module, and the pixel units in each of odd-numbered columns of the pixel array are respectively electrically connected to a first end of the third switching circuit of the switch selection module;
   the pixel units in each of even-numbered columns of the pixel array are respectively electrically connected to a first end of the second switching circuit of the switch selection module, and the pixel units in each of even-numbered columns of the pixel array are respectively electrically connected to a first end of the fourth switching circuit of the switch selection module;
   wherein second ends of adjacent first switching circuit and second switching circuit are electrically connected to a common first analog-to-digital converter, second ends of the adjacent third switching circuit and fourth switching circuit are electrically connected to a common second analog-to-digital converter, and each of the first switching circuit, the second switching circuit, the third switching circuit and the fourth switching circuit is electrically connected to only one analog-to-digital converter.

2. The pixel processing circuit according to claim 1, wherein the first switching circuit comprises at least one switch, the second switching circuit comprises at least one switch, the third switching circuit comprises at least one switch, and the fourth switching circuit comprises at least one switch.

3. The pixel processing circuit according to claim 1, wherein each column of pixel units is respectively connected to a corresponding switching circuit through an output bus.

4. The pixel processing circuit according to claim 1, wherein each of the pixel units comprises a photodiode, a transfer transistor, a reset transistor, a source-follower transistor, and a row selection transistor;
   a first end of the photodiode is grounded, and a second end of the photodiode is connected to a drain of the transfer transistor; a gate of the transfer transistor is configured for accessing a TX signal, and a source of the transfer transistor is connected to a drain of the reset transistor and a gate of the source-follower transistor; a source of the reset transistor is configured for accessing a power supply signal, and a gate of the reset transistor is configured for accessing an RX signal; a source of the source-follower transistor is configured for accessing the power supply signal, a drain of the source-follower transistor is connected to a source of the row selection transistor, a gate of the row selection transistor is configured for accessing an SEL signal, and a drain of the row selection transistor is connected to an output bus of the pixel unit;
   wherein the drain of the reset transistor is connected to the source of the row selection transistor to obtain a row selection control signal for transferring a pixel signal through the row selection transistor.

5. The pixel processing circuit according to claim 4, wherein each of the analog-to-digital converters comprises a comparator and a counter electrically connected to the comparator.

6. A reading method for the pixel processing circuit according to claim 1, comprising:

performing low-by-low reading and quantization processing for the plurality of pixel units in the pixel array according to a row selection control signal, comprising:

adjusting a conduction state of each switch selection module so that pixel signals of green pixel units and pixel signals of remaining color pixel units in each row of the pixel array are respectively read by analog-to-digital converters located at different sides of the pixel array while pixel signals of the green pixel units in different rows of the pixel array are read by analog-to-digital converters located at a same side of the pixel array; and the remaining color pixel units being red pixel units and/or blue pixel units.

7. The reading method of the pixel processing circuit according to claim 6, wherein the conduction state of the switch selection module comprises:

at a time of a read phase, the first switching circuit and the fourth switching circuit of the switch selection module being in a same conduction state, the second switching circuit and the third switching circuit being in the same conduction state, the first switching circuit and the third switching circuit being in opposite conduction states, and the conduction state of the switch selection module being opposite when reading odd-numbered rows and even-numbered rows of the pixel array.

8. An image sensor comprising:

the pixel processing circuit according to claim 1;

a control logic module for controlling the pixel processing circuit to process a pixel signal; and a data processing module for obtaining a signal processed by the pixel processing circuit.

* * * * *